INVENTOR.
Philip B. Zeigler
BY
D. L. Ellis
ATTORNEY

Feb 16, 1971  P. B. ZEIGLER  3,563,111
ADJUSTABLE CONTROL PEDALS
Filed July 24, 1968  4 Sheets-Sheet 2

INVENTOR.
Philip B. Zeigler
BY
D. L. Ellis
ATTORNEY

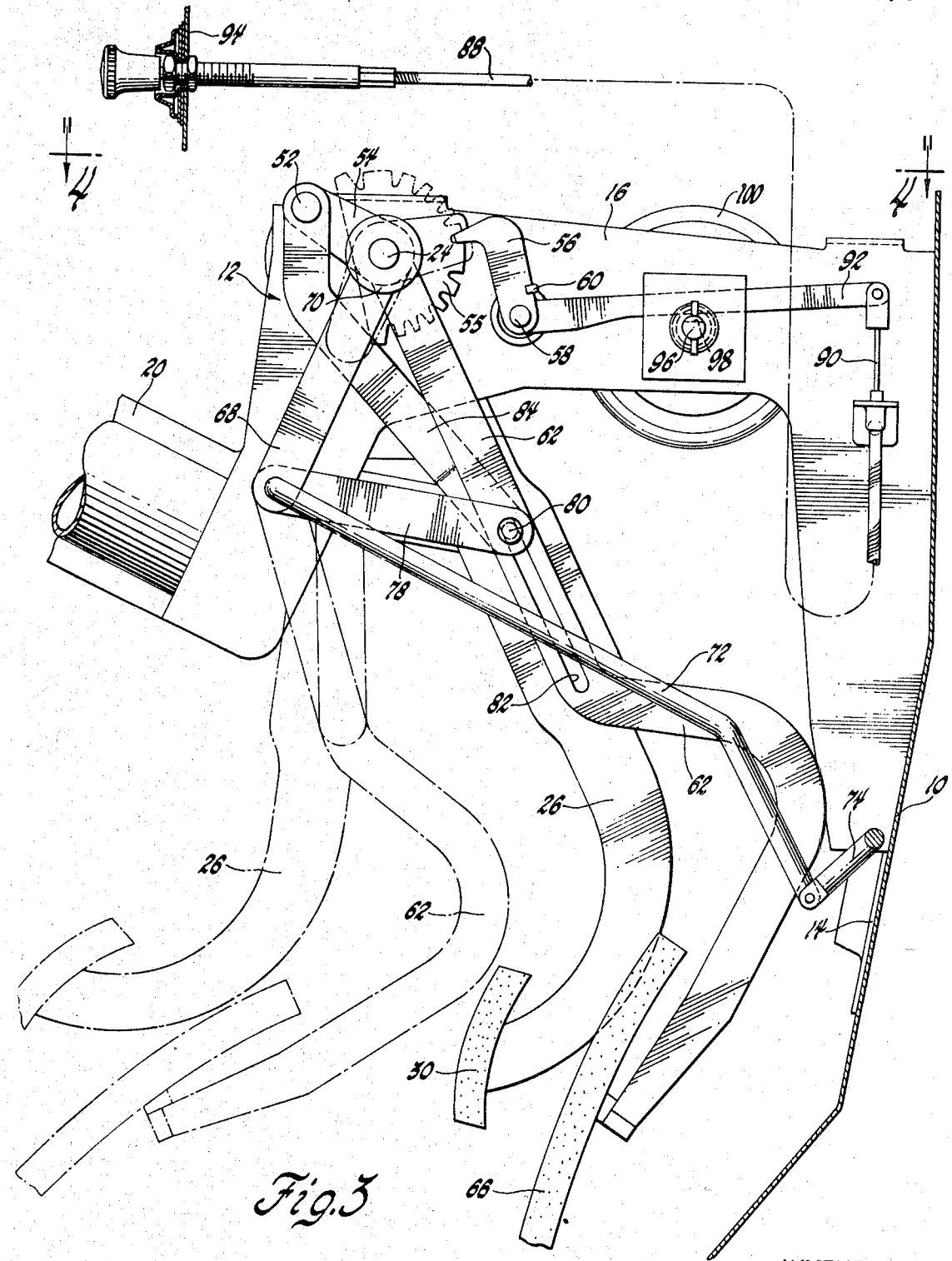

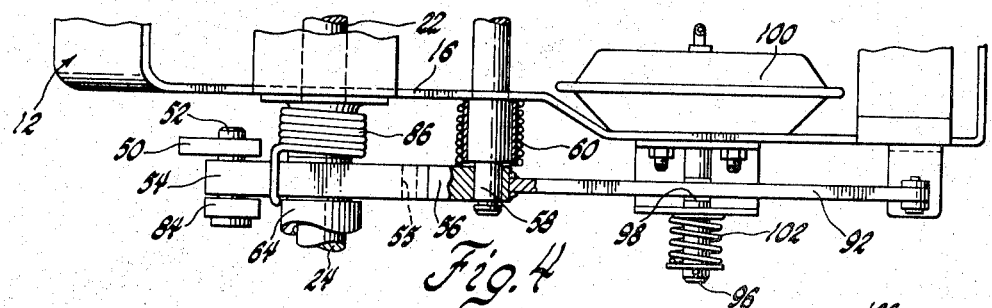
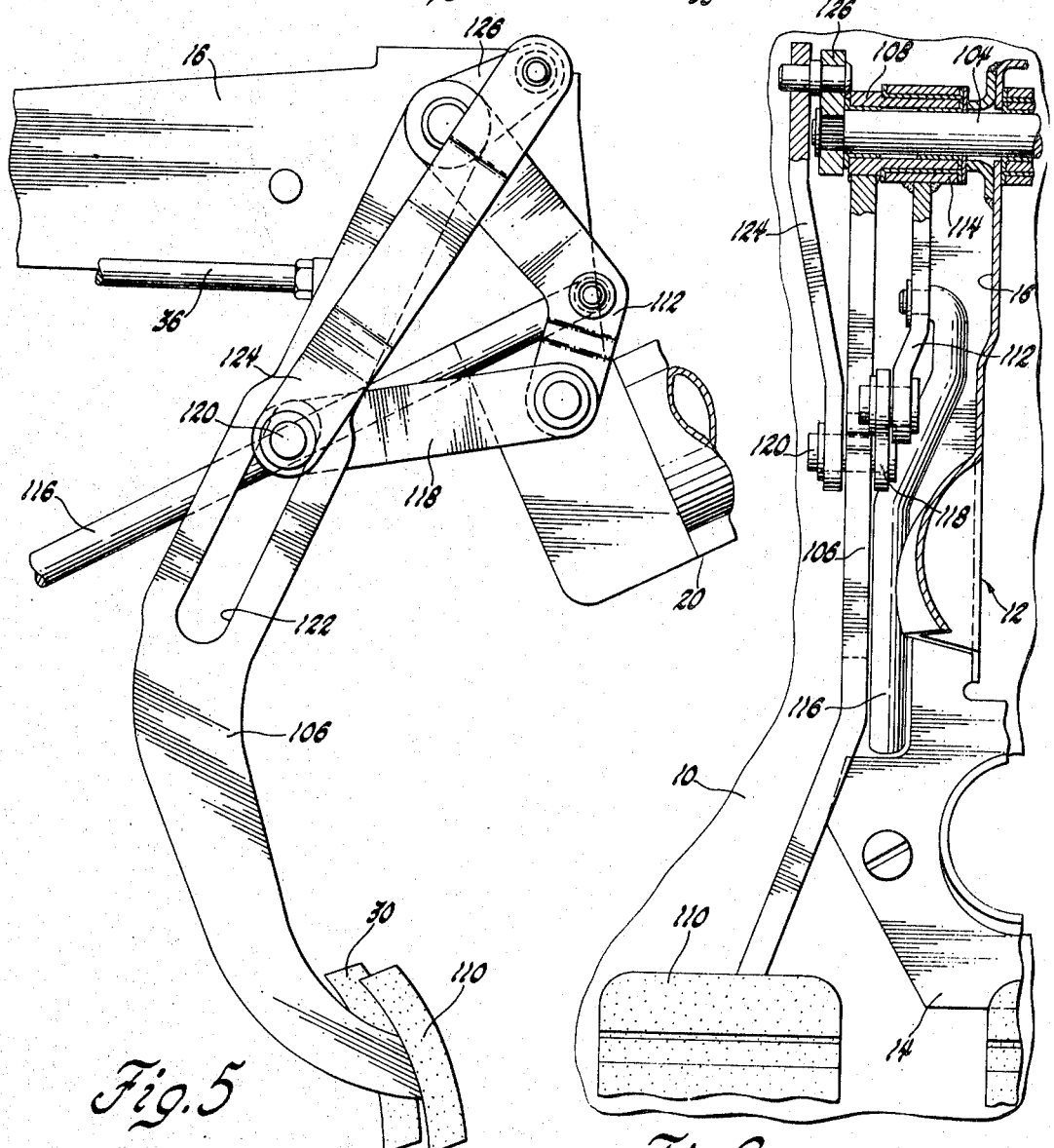
Feb 16, 1971  P. B. ZEIGLER  3,563,111
ADJUSTABLE CONTROL PEDALS
Filed July 24, 1968  4 Sheets-Sheet 4
INVENTOR.
Philip B. Zeigler
BY
D. L. Ellis
ATTORNEY United States Patent Office 3,563,111
Patented Feb. 16, 1971

1

3,563,111
ADJUSTABLE CONTROL PEDALS
Philip B. Zeigler, Pittsford, N.Y., assignor to General
Motors Corporation, Detroit, Mich., a corporation of
Delaware
Filed July 24, 1968, Ser. No. 747,173
Int. Cl. G05g 1/04
U.S. Cl. 74—512
4 Claims

ABSTRACT OF THE DISCLOSURE

A control pedal arrangement for automotive vehicle throttle, brake and clutch mechanisms includes a suspended swingably mounted control pedal for each of the control mechanisms and connected with a shiftable control rod from the respective control mechanism through means of an adjusting link having pivotal connection with the control rod and having pin and slot connection with such pedal member in a manner permitting positional adjustment of such pedal member on the mechanism control rod and relative to the passenger seat to suit the needs of an individual vehicle operator. The pedal member is selectively adjusted by an operating link connected to the adjusting link and driven by a crank which is spring-biased in one direction of adjustment and responsive to foot pressure on the pedal members for adjustment in the other direction, with latching means provided to hold the pedals in a selected position.

One feature of this invention is that it provides a new and improved control pedal arrangement for automotive vehicles or the like wherein the several pedals for the service brake, throttle and clutch mechanisms of the vehicle are positionally adjustable relative to the vehicle operator's seat to suit the needs of individual operators. Another feature of this invention is that the adjustable control pedal arrangement includes for each of the vehicle mechanisms a pedal member swingably mounted on the vehicle body as a second-class lever for connection with a shiftable or like mechanism control rod extending from the respective control mechanism, with adjusting linkage being connected intermediate the mechanism control rod and the pedal member and operative to positionally adjust the pedal member relative to the mechanism control rod and thus also to the operator's seat. A further feature of the invention resides in the arrangement of the adjusting linkage to include a common adjustment operating means whereby the several control pedals may be positionally adjusted in unison by a single manual or power adjustment control mechanism. Yet another feature of the invention resides in a manual adjustment control mechanism including a biasing agency for urging the several control pedals in one direction to one limit position, foot pressure applied on one of the pedals in opposition to the biasing agency being operative to move the several pedals in the opposite direction to an opposite limit position, with locking means being provided for holding the several pedals in a selected adjusted position against the force of the biasing agency and control pressure applied to the several pedals.

These and other features and advantages of the invention will be readily apparent from the following specification and drawings wherein.

2

Figure 2:
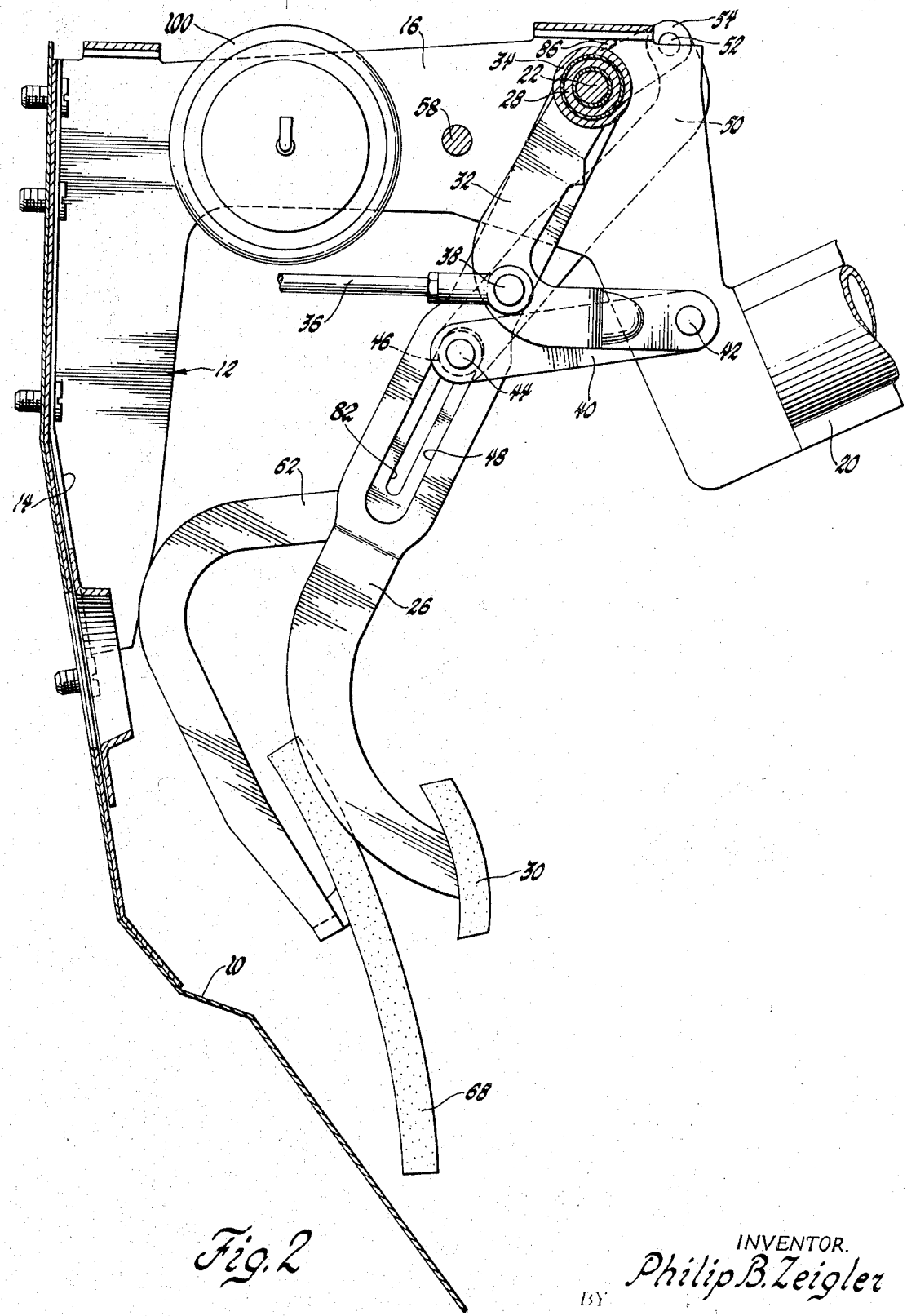
FIG. 2 is a sectional view taken generally along the plane indicated by lines 2—2 of FIG. 1 indicating the limit adjusted positions of the service brake pedal in solid and broken lines respectively.

FIG. 3 is a view taken generally along the plane indicated by lines 3—3 of FIG. 2 and again showing the limit adjusted positions of the brake and throttle pedals indicated in solid and broken lines;

FIG. 4 is a view of a portion of the adjustment control mechanism taken generally along the plane indicated by lines 4—4 of FIG. 3;

FIG. 5 is a view similar to FIG. 2 showing a further embodiment of the invention including a clutch pedal; and FIG. 6 is an elevational view partially in section showing the further embodiment of FIG. 5.

Referring now particularly to FIGS. 1 through 4 of the drawings, an adjustable control pedal arrangement according to the invention is shown installed in an automotive vehicle body in a typical environment therein wherein the pedals for the various vehicle control mechanisms are to be placed in the vehicle passenger compartment in a space intervening between the vehicle operator's seat, not shown, and a forward body bulkhead or firewall, designated as 10. In this first described embodiment of the invention, only the service brake and throttle control pedals are provided. The control pedal arrangement is illustrated as being included in a vehicle control module or package including a rigid support frame or bracket 12 including suitable flange portions 14 attached to the vehicle firewall 10 and extending rearwardly for suitable connection with the vehicle instrument panel structure. The frame further includes a control pedal mounting portion 16 having laterally spaced walls provided with shaft bearing sleeves 18, and a support tube 20 suitable for reception of the upper portion of the vehicle steering column assembly which may project at its lower portion through an annular mounting flange of the frame adjacent the firewall 10 formed in the flanges 14.

Figure 1:
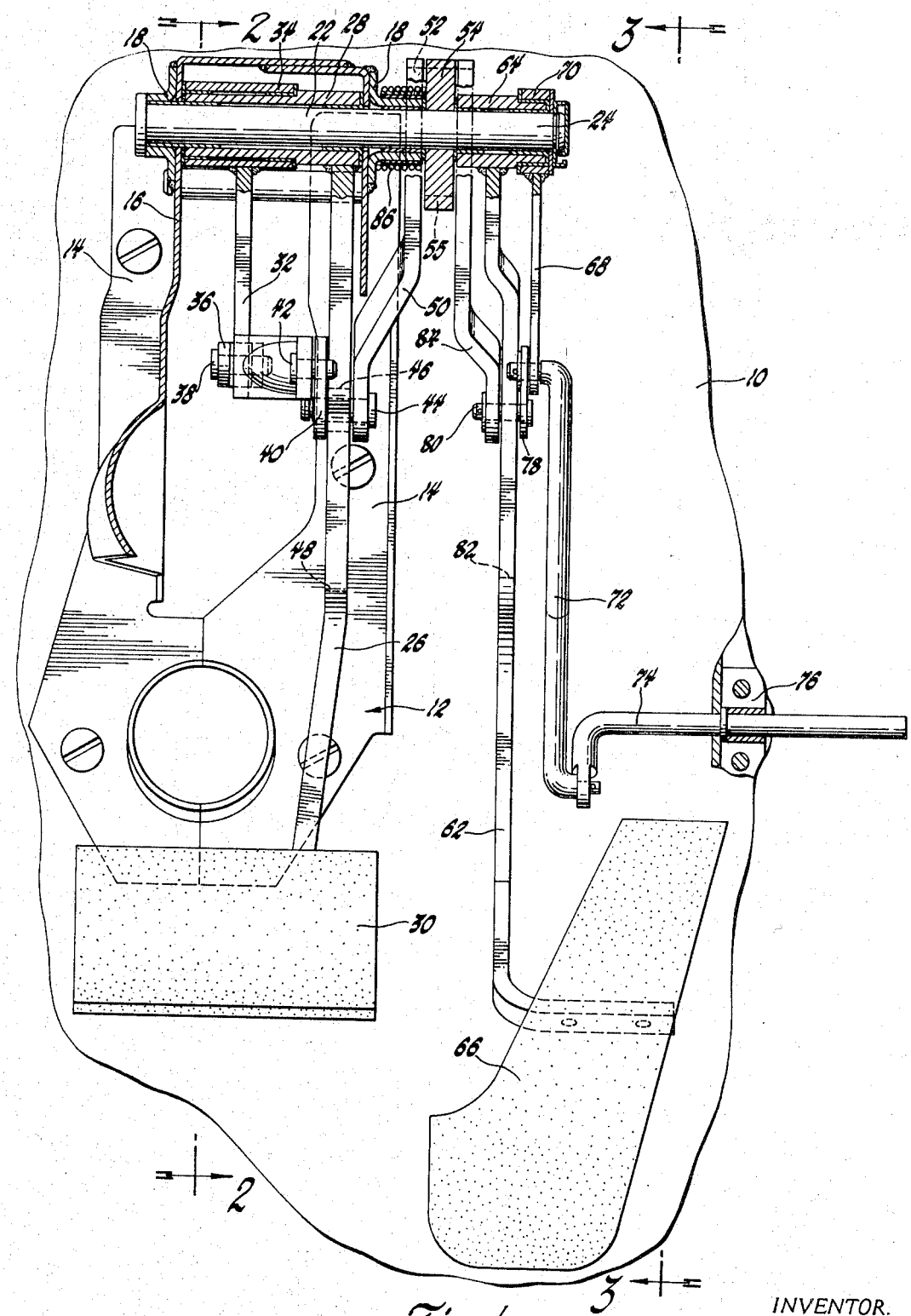
FIG. 1 is an elevational view partially in section showing an adjustable control pedal arrangement according to the invention installed in an automotive vehicle body.

Referring particularly to FIGS. 1 and 2, a mounting shaft 22 is rotatably fixed within the bearing sleeves 18 of frame portion 16 and includes an extension 24 provided for the throttle control unit. Dealing first with the service brake pedal unit, the same includes a pedal member 26 provided at its upper end with a support hub 28 rotatably mounted and bushed on shaft 22 and provided at its lower extremity with the usual foot pad 30. A brake control lever 32 is in turn rotatably mounted upon the brake pedal hub 28 by its surrounding hub portion 34. The lever 32 is seen as being of hook-like shape with one leg thereof being bent into an offset configuration to have one portion lie proximate the plane of pedal member 26. The brake control rod 36 is attached to the other offset portion of the lever by a pin and clevis 38, the rod 36 extending through a suitable aperture in firewall 10 to the vehicle service brake mechanism, not shown. It will be understood that the brake mechanism, whether it be standard or power assisted, is of conventional nature and includes the usual reaction means such as return springs or hydraulic pressure presenting a resistance through the rod 36 to shifting movement of the latter in a direction actuating the brake mechanism. This resistance is utilized in the pedal apparatus of this invention to aid in the adjustment of the several pedal members, as particularly described hereinafter.

An adjusting link 40 is provided for connecting the pedal member 26 with the control lever 32, the one offset portion of the member 32 having connection with link 40 by a pin 42 and the other end of link 40 carrying a pin 44 with a roller 46 thereover received in an elongated slot 48 extending longitudinally in the pedal member 26. Further connected to the pin 44 at the opposite side of the pedal member from the lever 32 is one end of an operating member 50 extending upwardly from the adjusting link to have its other end connected by a pin 52 to a crank 54. The crank 54 is formed as a portion of a ratchet member which is either integrally formed on the shaft 22 or splined or otherwise nonrotatably mounted thereto for unitary rotation therewith. The other portion of this ratchet member is provided with a series of teeth 55 suitable for meshed engagement with a locking pawl 56 which is pivotally mounted on the frame 12 by a shaft 58, all best seen in FIGS. 3 and 4. A coil torsion spring 60 is wound about the shaft 58 and hooked between frame 12 and pawl 56 in a manner biasing the pawl into a latched position meshed with the ratchet teeth 55.

Describing now the throttle linkage and pedal unit seen best in FIGS. 1 and 3, the same includes a pedal member 62 having a mounting hub 64 received over and suitably bushed upon the extension 24 of shaft 22 and includes at its other end the usual foot pad 66. A throttle control lever 68 includes a mounting hub 70 rotatably received on a reduced end of the hub 64 of the pedal member 62. A throttle control rod 72 is pivotally attached at one end thereof to the distal end of lever 68 and extends forwardly to the firewall for further pivotal attachment with a throttle actuating lever 74 which extends through an aperture in the firewall to be pivotally mounted in a bushed bracket 76 attached to the forward side of the firewall in conventional manner. Lever 74 connects with the engine carburetor linkage in well-known fashion, the latter also including conventional return spring means. An adjusting link 78 for the throttle pedal has one end pivotally received through lever 68 and secured thereto, with the other end of the adjusting link receiving a headed pin 80 which is slidably received within an elongated longitudinally extending slot formed in the pedal member 62. An adjustment operating member 84 has its lower end received on the projecting end of the pin 80 and secured thereto and has its upper end pivotally secured on the pin 52 of the crank 54.

In operation, pedal members 26 and 62 are each operative in normal manner under control forces supplied by the operator's foot to rotate on shaft 22 between a normal or nonactuated position established in the rods 36 and 72 by the return means in the throttle and brake mechanisms, and a depressed or actuated position displaced toward the vehicle firewall to shift either rod forwardly to operate the vehicle brake or throttle mechanisms. The brake and throttle pedal members 26 and 62 are further swingable on shaft 22 relative to these rods and their corresponding control levers 32 and 68 for selected adjustment of the normal or nonactuated positions thereof relative to the operator's seat of the vehicle over a range between a forwardmost and rearwardmost positions indicated in solid and broken lines respectively in FIGS. 2 and 3. Taking as an example the brake pedal member 26, normal brake actuating movement thereof from the solid line position in FIG. 2 to a depressed position is transferred through the pin and roller 44 and 46 to the adjusting link 40 and thence to the lever 32 which rotates to shift rod 36 inwardly. During this movement, a slight vertical displacement obtains on the pin 44 and roller 46 due to the slight eccentricity between pin 52 and shaft 22 and this is of course accommodated by slight pivoting of the adjusting link 40 about pin 42 and by pivoting of the operating member 50 about pin 52.

To adjust member 26 in its nonactuated position relative to the operator's seat, the adjusting link 40 is caused to rotate about the pin 42 to cause the pin roller and slot connection thereof with the pedal member to effect displacement of the pedal member relative to the control lever 32 which is held by the brake mechanism. Such rotation of the adjusting link is accomplished by a generally vertical shifting movement of the operating member 50 either upward or downward by corresponding rotation of the crank 54. A coil torsion spring 86, shown best in FIG. 1, is wound over a sleeve 18 of frame 12 and hooked on the crank 54 in a manner to bias the crank clockwise as the parts appear in FIG. 2. The crank is of course normally held against such action of the spring 86 by the engagement of pawl 56 with the ratchet teeth 55. To positionally adjust the pedal member 32 rearwardly from the solid to the broken line position of FIG. 2, pawl 56 is released from teeth 55 to allow the torsion spring 86 to rotate the crank 54 clockwise and displace the operating member 50 downwardly. Such release of the pawl may be accomplished through the agency of a manual control including a flexible push-pull cable 88 having its core 90 pivotally attached to a leg 92 secured to the pawl, the cable extending to a knob mounted at a suitable location on the vehicle instrument panel indicated at 94. The described downward shifting movement of operating member 50 displaces the pin and roller 44 and 46 downwardly to unfold or rotate the adjusting link 40 counterclockwise about pin 42 and thereby rotate the pedal member 26 rearwardly toward or actually to the broken line position. In such position, the adjusting link 40 and operating member have been moved generally to positions locating the pin and roller at the bottom of slot 48.

Thus it is seen that adjustment of the brake pedal member 26 rearwardly can be accomplished merely by operating the cable 88 for release of the pawl 56 to allow the torsion spring 86 to unfold the adjusting link 40 and translate the roller 46 downwardly, and the exact position of the pedal is conveniently controlled by the operator's foot applied to the brake pedal against the bias thereon of spring 86 and by hand control of cable 88. To adjust the brake pedal member 26 in a forward direction as, for example, from the broken line rearwardmost position shown, the cable 88 is again operated to release the pawl, the foot pressure is applied to the brake pedal member moving it forwardly by overcoming the bias of the spring 86. The lever 32 and link 40 are resiliently held against forward movement by the brake mechanism and the roller 46 is accordingly caused to rotate upwardly in the slot 48 to fold the adjusting link 40 clockwise back toward the position shown in FIG. 2 and to translate the operating member 50 upwardly and rewind spring 86. The strength of spring 86 is chosen to provide sufficient force seeking to normally rotate the pedal member 26 rearwardly under release of the pawl but not so strong as to cause the just described foot pressure on the brake pedal for forward adjustment thereto to be directed into rotation of lever 32 and shifting movement of the rod 36. Rather, the normal resistance to actuation provided in the brake mechanism is utilized by correct selection of the spring to hold lever 32 stationary in this operation to effect the folding movement of the adjusting link and upward translation of the operating member against the torsion spring 86.

The described adjustment operation for brake pedal 26 applies equally to the throttle control unit in that the adjustment control provided by the adjusting link 78 and operating member 84 therefor operate simultaneously with the operating member 50 and adjusting link 40 by virtue of common connection on the crank 54. Thus, release of pawl 56 to allow rearward adjustment of the pedals causes the bias of spring 86 on the crank to be similarly applied for downward displacement of the operating member 84 and unfolding rotation of adjusting link 78 in the clockwise direction relative to lever 68, FIG. 3, to move the pin 80 downwardly in slot 82 and shift the throttle pedal member 62 rearwardly. Again, lever 68 finds resistance to disturbance during this operation in the normal return forces applied by the throttle mechanism to hold the rod 72 rearwardly. The forward foot pressure applied to the brake pedal member 26 for forward adjustment thereof likewise transmits through the adjustment linkage for the brake unit to the crank 54 to shift operating member 84 upwardly and translate the pin 80 upwardly in the slot 82 and fold the adjusting link 78 counterclockwise toward the forwardmost adjusted position of the pedal member 62 shown in solid lines in FIG. 3. It will of course be appreciated again that the pedal members may be adjusted to any selected position intermediate these extreme positions shown by the foot control on brake pedal member 26 and hand control of cable 88.

In order to prevent inadvertent displacement or adjustment of the brake and throttle pedals 26 and 62 during movement of the vehicle on the highway, etc., a blockout is provided against releasing rotation on pawl 56 from its engaged position meshed with the ratchet teeth 55. The blockout may take the form such as shown best in FIGS. 3 and 4 of a shaft 96 overlying the leg 92 on the pawl and notched at 98 to allow releasing rotation of such leg during suitable conditions of vehicle operation, as for example with the transmission in "Park." During the operating conditions in which rotation of the leg 92 is proscribed, engine vacuum may be applied to a vacuum motor 100 connected with the shaft and operative to withdraw the shaft from the position shown in FIG. 4 inwardly to a position misaligning the notch 98 and engaging the shaft immediately over the leg 92 to prevent releasing rotation thereof. A return spring 102 realigns the notch with the leg when the vacuum motor is de-energized.

A modification is shown in FIGS. 5 and 6 illustrating the addition of a clutch control unit to the throttle and brake control units previously described. Shaft 22 is provided with an extension 104 adjacent the left side of frame 12 and rotatably mounts the hub portion 108 of a clutch pedal member 106 carrying a foot pad 110 at its free end. As with the throttle and brake control units, the hub portion 108 rotatably mounts thereover a hub portion 114 of a clutch control lever 112 having a clutch control rod 116 pivotally attached thereto intermediate the ends of the lever. The rod 116 extends through the vehicle firewall 10 to connect with the clutch mechanism which again is biased to an engaged position locating the rod rearwardly to the position shown. An adjusting link 118 has one end pivotally secured to the free end of control lever 112 and has a pin 120 at its opposite end received in a slot 122 of the pedal member 106. Further connected to the pin 120 is an operating member 124 pivotally attached at its opposite end to a crank 126 splined or otherwise secured to the shaft extension 104. It is believed clear that the adjusting link 118 and operating member 124 operate in identical manner with the counterpart links described in connection with the brake and throttle units hereinabove and that the clutch pedal member 106 will be adjusted simultaneously with the brake and throttle pedals by unitary movement of the crank 126 with the crank 54, either by the bias of spring 86 shifting the pedals rearwardly, or by foot pressure applied to the brake pedal 26 to adjust the pedals forwardly.

Other various modifications and alternatives are readily apparent from the foregoing description. For example, the positional adjustment afforded between the various pedal members and their respective control levers by virtue of the pin and slot connection on the intervening adjusting link may be accomplished by rearrangements or relocations of the pin in the pedal member and the slot in the adjusting link. It will further be appreciated that other adjustment control means may be provided in place of the shiftable operating members 50 and 84 and the cranks therefor such as, for example, a screw and nut actuator suitably attached to one end of the adjusting link at the pin and slot connection thereof with the pedal or control lever members and operative to translate the pin and slot connection for adjusted positions of the pedal members.

Having thus described the invention, what is claimed is:

1. In a vehicle body including a control mechanism to be operated, control pedal apparatus comprising, a mounting shaft on said body, a pedal member mounted on said shaft for swinging movement about an axis adjacent one end of the pedal member, a movable control member rotatably mounted on said shaft and connected to said mechanism for actuation thereof, an adjusting link pivotally attached adjacent one end thereof on one of said members, pin and slot means connecting the other end of said adjusting link with the other of said members for pivotal movement of said adjusting link about said one end thereof to various adjusted relationships with said other member, an operating member connected at one end thereof with said other end of said adjusting link, an operating crank rotatably mounted on said shaft and connected with the other end of said operating member whereby rotation of said crank effects said various adjusted relationships of said adjusting link through said operating member, said adjusting link upon said movement thereof to said various adjusted relationships with said other member being operative to move said pedal member relative to said control member to positionally adjust said pedal member relative to said body, and operating means for selectively moving said connecting means to move said adjusting link to said various selected positions thereof.

2. Control pedal apparatus as recited in claim 1 further including biasing means biasing said crank in one direction to move said adjusting link in a direction moving said pedal member to one limit adjusted position thereof relative to said body, and locking means for holding said crank in a selected position against the action of said biasing means.

3. In a vehicle body including a control mechanism to be operated, control pedal apparatus comprising, a pedal member mounted on said body for swinging movement thereof to said various adjusted relationships with ber, a movable control member on said body connected to said mechanism for actuation thereof, an adjusting link pivotally attached adjacent one end thereof to one of said control and pedal members, pin and slot means connecting the other end of said adjusting link with the other of said members for pivotal movement of said adjusting link about said one end thereof to various adjusted relationships with said other member whereby to move said pedal member relative to said control member to various adjusted positions of said pedal member relative to said body, means biasing said adjusting link in one pivotal direction to move said pedal member to one limit adjusted position thereof, and locking means for holding said adjusting link against said biasing means in a selected position of said pedal, control forces applied to said pedal member while said locking means are engaged moving said adjusting link and said control member as a unit with said pedal member to actuate said mechanism, control forces applied to said pedal member during release of said locking means moving said adjusting link with said pedal member against said biasing means in the opposite pivotal direction relative to said other member to an opposite limit adjusted position of said pedal member.

4. In a vehicle body including a control mechanism to be operated, control pedal apparatus comprising, a pedal member mounted on said body for swinging movement about an axis adjacent one end of the pedal member, a movable control member on said body and connected to said mechanism for actuation thereof, an adjusting link pivotally connected adjacent one end thereof to said control member, pin means on the other end of said adjusting link received in a longitudinally extending slot in said pedal member for connecting said pedal and control members, movement of said pin in said slot under pivotal movement of said adjusting link about said one end thereof moving said pedal member relative to said control member to various selected positions of the pedal member relative to said body, an operating member mounted on said body for generally shiftable movement relative thereto and connected to said adjusting link, means biasing said operating member in one direction to move said adjusting link in a direction moving said pedal member to one limit adjusted position thereof relative to said body, locking means for holding said operating member against said biasing means in a selected position of said pin in said slot at an adjusted position of said pedal member, control forces applied to said pedal member while said locking means are engaged moving said adjusting link and said control member as a unit with said pedal member to actuate said mechanism, control forces applied to said pedal member during release of said locking means moving said adjusting link as a unit with said pedal member relative to said control member in an opposite direction against said biasing means to an opposite limit adjusted position of said pedal member.

References Cited

FOREIGN PATENTS 1,094,113    12/1960    Germany _____ 74—513

M. CARY NELSON, Primary Examiner

W. S. RATLIFF, Jr., Assistant Examiner

U.S. Cl. X.R.

74—513